(12) United States Patent
Park et al.

(10) Patent No.: US 12,475,380 B2
(45) Date of Patent: Nov. 18, 2025

(54) NEURAL NETWORK MODEL DEPLOYMENT METHOD AND APPARATUS FOR PROVIDING DEEP LEARNING SERVICE

(71) Applicant: ELECTRONICS AND TELECOMMUNICATIONS RESEARCH INSTITUTE, Daejeon (KR)

(72) Inventors: Jae-Bok Park, Daejeon (KR); Chang-Sik Cho, Daejeon (KR); Kyung-Hee Lee, Daejeon (KR); Ji-Young Kwak, Gwangju (KR); Seon-Tae Kim, Daejeon (KR); Hong-Soog Kim, Daejeon (KR); Jin-Wuk Seok, Daejeon (KR); Hyun-Woo Cho, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 177 days.

(21) Appl. No.: 18/209,617

(22) Filed: Jun. 14, 2023

(65) Prior Publication Data
US 2024/0069875 A1    Feb. 29, 2024

(30) Foreign Application Priority Data
Aug. 25, 2022  (KR) .......................... 10-2022-0106687

(51) Int. Cl.
*G06F 8/35*  (2018.01)
*G06F 8/36*  (2018.01)
(Continued)

(52) U.S. Cl.
CPC ................. *G06N 3/10* (2013.01); *G06F 8/36* (2013.01); *G06F 8/60* (2013.01); *G06F 9/453* (2018.02);
(Continued)

(58) Field of Classification Search
CPC .......... G06N 3/045; G06N 3/082; G06N 3/08; G06N 20/00; G06N 3/10; G06V 20/69;
(Continued)

(56) References Cited

U.S. PATENT DOCUMENTS 10,380,498 B1    8/2019  Chaoji et al.
2004/0128003 A1*  7/2004  Frampton .............. G05B 15/02
                                              700/31
(Continued)

FOREIGN PATENT DOCUMENTS

KR    10-2019-0085823 A    7/2019
KR    10-2020-0080819 A    7/2020

OTHER PUBLICATIONS

Li et al, CN 109816663 (translation), May 289, 2019, 29 pgs <CN_109816663.pdf>.*

*Primary Examiner* — Tuan A Vu
(74) *Attorney, Agent, or Firm* — LRK PATENT LAW FIRM

(57) ABSTRACT

Disclosed herein are a neural network model deployment method and apparatus for providing a deep learning service. The neural network model deployment method may include providing a specification wizard to a user, searching for and training a neural network based on a user requirement specification that is input through the specification wizard, generating a neural network template code based on the user requirement specification and the trained neural network, converting the trained neural network into a deployment neural network that is usable in a target device based on the
(Continued)

user requirement specification, and deploying the deployment neural network to the target device.

20 Claims, 6 Drawing Sheets

(51) Int. Cl.
*G06F 8/60* (2018.01)
*G06F 9/451* (2018.01)
*G06N 3/08* (2023.01)
*G06N 3/10* (2006.01)
G05B 15/02 (2006.01)
G06N 3/045 (2023.01)
G06N 3/082 (2023.01)
G06Q 30/0283 (2023.01)
G06V 20/69 (2022.01)

(52) U.S. Cl.
CPC ............... *G06N 3/08* (2013.01); *G05B 15/02* (2013.01); *G06N 3/045* (2023.01); *G06N 3/082* (2013.01); *G06Q 30/0283* (2013.01); *G06V 20/69* (2022.01)

(58) Field of Classification Search
CPC ............... G06V 10/255; G06V 10/454; G06Q 30/0283; G05B 15/02; G06F 16/9535
See application file for complete search history.

(56) References Cited

U.S. PATENT DOCUMENTS

| | | |
|---|---|---|
| 2007/0143284 A1 | 6/2007 | Lee et al. |
| 2018/0107928 A1* | 4/2018 | Zhang ................... G06N 3/082 |
| 2019/0213480 A1 | 7/2019 | Lim et al. |
| 2020/0320748 A1* | 10/2020 | Levinshtein ......... G06V 10/454 |
| 2021/0027083 A1* | 1/2021 | Cohen .................. G06V 10/255 |
| 2021/0297878 A1* | 9/2021 | Mondragon ............. G06N 3/08 |
| 2021/0349865 A1* | 11/2021 | Shah .................. G06Q 30/0283 |
| 2021/0383530 A1* | 12/2021 | Peleg .................... G06V 20/69 |
| 2022/0198779 A1* | 6/2022 | Saraee ................ G06F 16/9535 |
| 2022/0215201 A1* | 7/2022 | Dwivedi ............... G06N 3/045 |
| 2022/0222525 A1 | 7/2022 | Lee et al. |
| 2023/0196203 A1* | 6/2023 | McKay .................. G06N 20/00 706/12 |

* cited by examiner

NEURAL NETWORK MODEL DEPLOYMENT METHOD AND APPARATUS FOR PROVIDING DEEP LEARNING SERVICE

CROSS REFERENCE TO RELATED APPLICATION

This application claims the benefit of Korean Patent Application No. 10-2022-0106687, filed Aug. 25, 2022, which is hereby incorporated by reference in its entirety into this application.

BACKGROUND OF THE INVENTION

1. Technical Field

The present disclosure a neural network model deployment method and apparatus, which allow a user to easily and rapidly search for a required neural network model, automatically create a desired neural network model and an application template code, and distribute and deploy the neural network model and the application template code.

2. Description of Related Art

Research into artificial neural network-based deep learning technology is actively conducted both domestically and internationally, and the application scope thereof is expanded to various embedded environments such as autonomous vehicles, unmanned vehicles, image processing devices, and factory automation.

Among artificial intelligence technology fields, deep learning-related technology is spreading the fastest, and particularly, image recognition technology is expected to form a significant market.

Neural Architecture Search (NAS) refers to technology that automates the design of an artificial intelligence neural network by searching for, through deep learning, the type and form of a neural network architecture that is most suitable for solving a specific problem.

Recently, although research and development have been conducted using neural network technology, neural network technology requires professional knowledge, and thus a problem arises in that small and medium-sized enterprises lacking expertise in neural network-based technology cannot utilize the neural network technology.

SUMMARY OF THE INVENTION

Accordingly, the present disclosure has been made keeping in mind the above problems occurring in the prior art, and an object of the present disclosure is to provide a neural network model deployment method and apparatus, which allow a deep learning service to be used without requiring professional knowledge in a neural network.

Another object of the present disclosure is to provide a neural network model deployment method and apparatus, which effectively provide a neural network model desired by a user.

In accordance with an aspect of the present disclosure to accomplish the above objects, there is provided a neural network model deployment method, including providing a specification wizard to a user, searching for and training a neural network based on a user requirement specification that is input through the specification wizard, generating a neural network template code based on the user requirement specification and the trained neural network, converting the trained neural network into a deployment neural network that is usable in a target device based on the user requirement specification, and deploying the deployment neural network to the target device.

The specification wizard may provide a screen corresponding to at least one of field selection, image selection, inference method selection, neural network level selection, a deployment method or a deployment target, or a combination thereof.

The neural network may be trained by utilizing, as training data, image data that is input through the screen for the image selection.

The training data may be generated by performing data labeling on the image data, and the neural network is trained based on the generated training data.

Searching for and training the neural network may include, when execution performance of the neural network does not satisfy preset performance, performing searching for the neural network.

Generating the neural network template code may include generating a basic application code by adding codes for the field selection, the image selection, the inference method selection, the neural network level selection, the deployment method, and the deployment target, and generating the neural network template code by applying at least one of input and output of the neural network, input of inference data or output of an inference value, or a combination thereof to the basic application code.

Converting the trained neural network into the deployment neural network may include optimizing the trained neural network, and converting the optimized neural network into the deployment neural network.

The neural network model deployment method may further include analyzing a structure of the converted neural network, and generating a container-type inference engine.

Deploying the deployment neural network to the target device may include deploying the deployment neural network to the target device in a single deployment manner or a distributed deployment manner.

The neural network model deployment method may further include managing a resource of the target device by monitoring the target device after the deployment neural network is deployed to the target device.

In accordance with another aspect of the present disclosure to accomplish the above objects, there is provided a neural network model deployment apparatus, including memory configured to store a control program for deploying a neural network model, and a processor configured to execute the control program stored in the memory, wherein the processor is configured to configured to provide a specification wizard to a user, search for and train a neural network based on a user requirement specification that is input through the specification wizard, generate a neural network template code based on the user requirement specification and the trained neural network, convert the trained neural network into a deployment neural network that is usable in a target device based on the user requirement specification, and deploy the deployment neural network to the target device.

The specification wizard may provide a screen corresponding to at least one of field selection, image selection, inference method selection, neural network level selection, a deployment method or a deployment target, or a combination thereof.

The processor may be configured to perform control such that the neural network is trained by utilizing, as training data, image data that is input through the screen for the image selection.

The processor may be configured to perform control such that the training data is generated by performing data labeling on the image data and the neural network is trained based on the generated training data.

The processor may be configured to, when execution performance of the neural network does not satisfy preset performance, re-search for the neural network.

The processor may be configured to generate a basic application code by adding codes for the field selection, the image selection, the inference method selection, the neural network level selection, the deployment method, and the deployment target and to generate the neural network template code by applying at least one of input and output of the neural network, input of inference data or output of an inference value, or a combination thereof to the basic application code.

The processor may be configured to optimize the trained neural network and convert the optimized neural network into the deployment neural network.

The processor may be configured to analyze a structure of the converted neural network and generate a container-type inference engine.

The processor may be configured to deploy the deployment neural network to the target device in a single deployment manner or a distributed deployment manner.

The processor may be configured to manage a resource of the target device by monitoring the target device after the deployment neural network is deployed to the target device.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
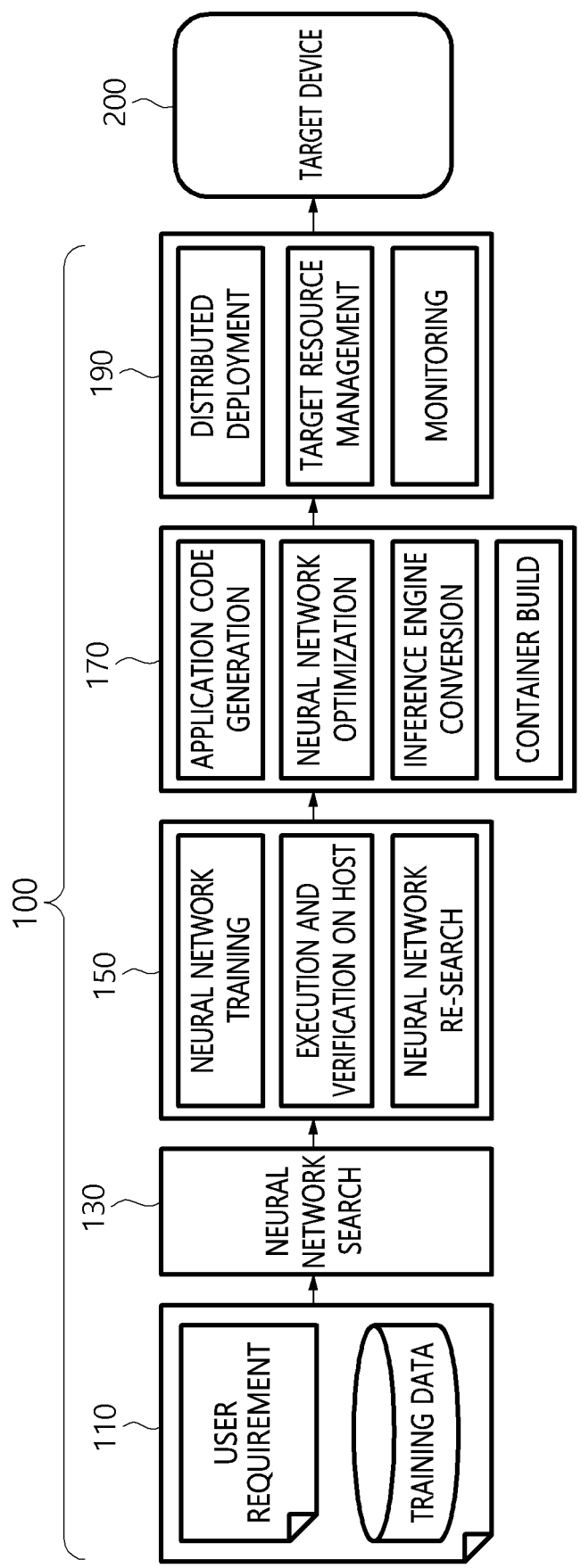
FIG. 1 is a block diagram illustrating a neural network model deployment apparatus according to an embodiment of the present disclosure.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Embodiments of the present disclosure will now be described in detail with reference to the accompanying drawings. Like numerals refer to like elements throughout, and overlapping descriptions will be omitted.

FIG. 1 is a block diagram illustrating a neural network model deployment apparatus according to an embodiment of the present disclosure.

Referring to FIG. 1, a neural network model deployment apparatus 100 according to an embodiment of the present disclosure may include a specification wizard provision unit 110, a neural network search unit 130, a neural network training unit 150, a deployment neural network creation unit 170, and a neural network deployment unit 190.

The specification wizard provision unit 110 may provide the screen of a specification wizard to a user.

The user may input a desired requirement specification through the specification wizard, and the specification wizard provision unit 110 may receive a user requirement specification based on the user input. Here, the user requirement specification may include a user requirement, training data, etc.

Figure 2:
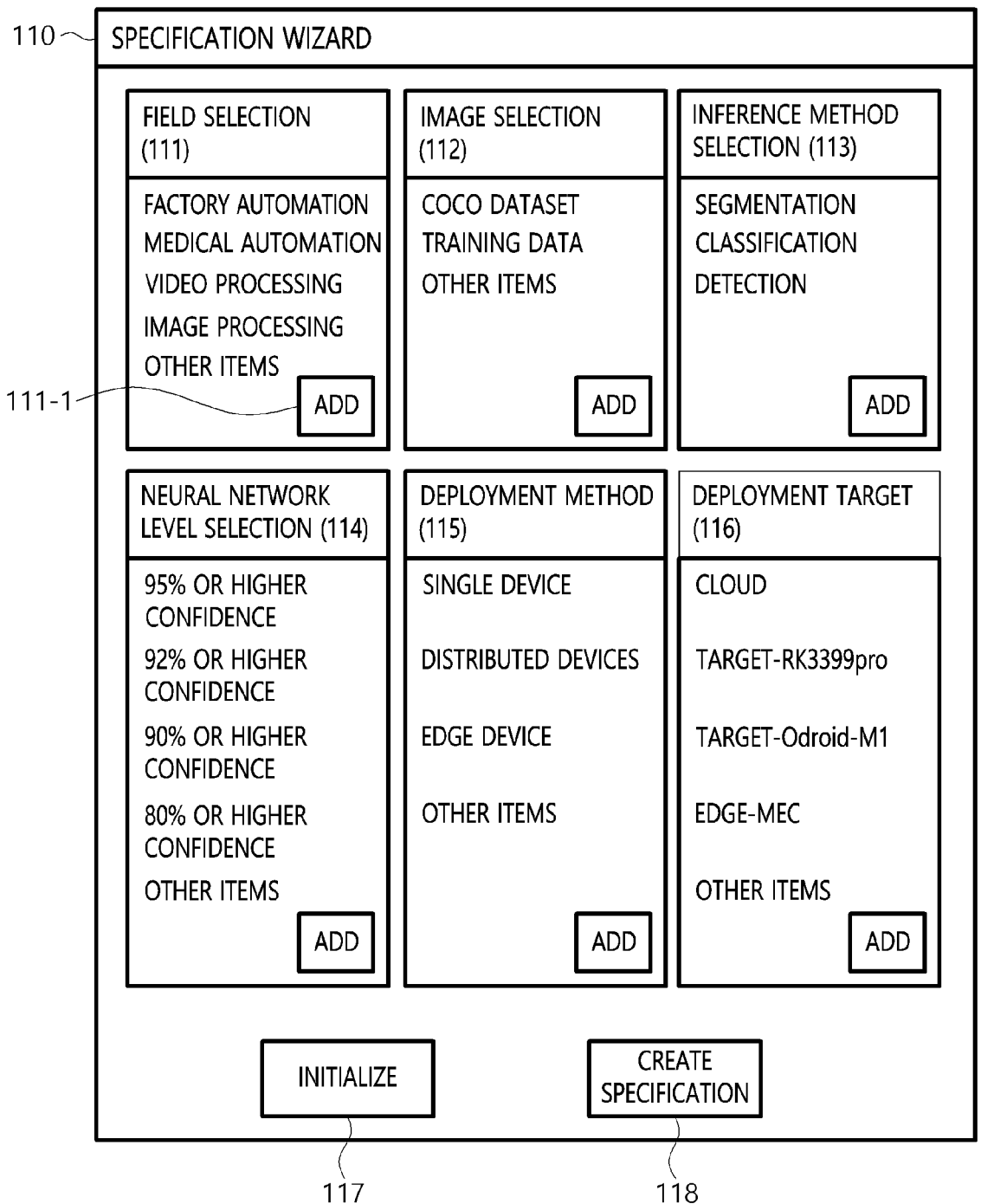
FIG. 2 is a diagram illustrating the specification wizard screen of a neural network model deployment apparatus according to an embodiment of the present disclosure.

FIG. 2 is a diagram illustrating the specification wizard screen of a neural network model deployment apparatus according to an embodiment of the present disclosure.

Referring to FIG. 2, the specification wizard provided by the specification wizard provision unit 110 may include a field selection item 111, an image selection item 112, an inference method selection item 113, a neural network level selection item 114, a deployment method item 115, and a deployment target item 116.

The field selection item 111 may include factory automation, medical automation, video processing, image processing, and other items. The image selection item 112 may include a Common Objects in Context (COCO) dataset, training data, and other items. The inference method selection item 113 may include segmentation, classification, and detection items. The neural network level selection item 114 may include items such as 95% or higher confidence, 92% or higher confidence, 90% or higher confidence, 80% or higher confidence, and other items. The deployment method item 115 may include single device deployment, distributed device deployment, edge device deployment, and other items. The deployment target item 116 may include cloud, RK3399pro, Odroid-M1, Multi-access Edge Computing (MEC), and other items.

Each of the field selection item 111, the image selection item 112, the inference method selection item 113, the neural network level selection item 114, the deployment method item 115, and the deployment target item 116 may further include an add item 111-1.

The specification wizard may further include an initialization item 117 and a specification creation item 118 in an area other than the area in which the selection items are displayed.

Referring back to FIG. 1, the neural network search unit 130 may search for a neural network based on the user requirement specification that is input through the specification wizard. The neural network may be searched for in a neural network space depending on the purpose of an application. Here, the neural network space may be provided with neural networks that are selectable depending on a table, vision (classification), and vision (recognition). The neural network search unit 130 may search for a neural network using a tool such as Neural Architecture Search (NAS) or Neural Network Intelligence (NNI).

The neural network training unit 150 may train the found neural network using training data. The training data may be generated by performing data labeling on images, such as a factory image, a medical image, and an object image that are input through the specification wizard. Accordingly, the neural network training unit 150 may provide a neural network model corresponding to the purpose of the user's application.

The neural network training unit 150 may train the neural network through a host terminal. The neural network training unit 150 may verify the execution performance of the trained neural network, and may repeat a process of searching for and training a neural network until preset execution performance (i.e., required execution performance) is satisfied when the execution performance of the trained neural network does not satisfy the required execution performance.

The deployment neural network creation unit 170 may convert the trained neural network into a deployment neural network (or a deployable neural network) that can be used by a target device 200.

The deployment neural network creation unit 170 may generate neural network template code from the trained neural network based on the user requirement specification and trained neural network information. The neural network template code may separate respective requirements in the requirement specification into requirement elements and separately store the requirement elements.

First, necessary basic code may be added according to the field, and the codes of input/output portions may be added based on the structure of the trained neural network.

Next, code may be added depending on the image selection method, and code for each inference method may be added. Next, single code or multiple codes may be copied depending on the deployment method or, alternatively, code may be added to be executed on an edge.

The neural network template code may be generated by applying at least one of the input and output of the neural network, the input of inference data or the output of an inference value, or a combination thereof to basic application code generated in the above-described process.

The neural network template code may be provided to allow the user to simply check the code or to add a desired application and immediately execute the application-added code.

The deployment neural network creation unit 170 may perform neural network optimization on the target device in accordance with the requirements. The deployment neural network creation unit 170 may generate codes and a container-type neural network inference engine through a container build process.

The neural network deployment unit 190 may deploy the neural network inference engine that is the deployment neural network to the target device 200 in a single deployment manner or a distributed deployment manner.

The target device 200 may include, but is not limited to, a computer, a mobile terminal, or a wearable device.

For example, the computer may include a notebook, a desktop, a laptop, etc., each equipped with a web browser.

The mobile terminal may be a wireless communication device guaranteeing portability and mobility, and may include all types of handheld wireless communication devices such as Long-Term Evolution (LTE), LTE-A, Personal Digital Cellular (PDC), Personal Handyphone System (PHS), Personal Digital Assistant (PDA), Global System for Mobile communications (GSM), International Mobile Telecommunication (IMT), Code Division Multiple Access (CDMA), Wideband-Code Division Multiple Access (W-CDMA), Wireless Broadband Internet (Wibro), smartphone, and Mobile Worldwide Interoperability for Microwave Access (WIMAX).

Furthermore, the wearable device may be an information processing device directly wearable on a human body, for example, a watch, glasses, accessories, clothes, shoes, or a smart watch, and may be connected to the neural network model deployment apparatus 100 over a network either directly or through an additional information processing device.

The neural network deployment unit 190 may monitor the target device 200, and manage the resources of the target device 200 through the monitoring. The neural network deployment unit 190 may control neural network applications.

Figure 3:
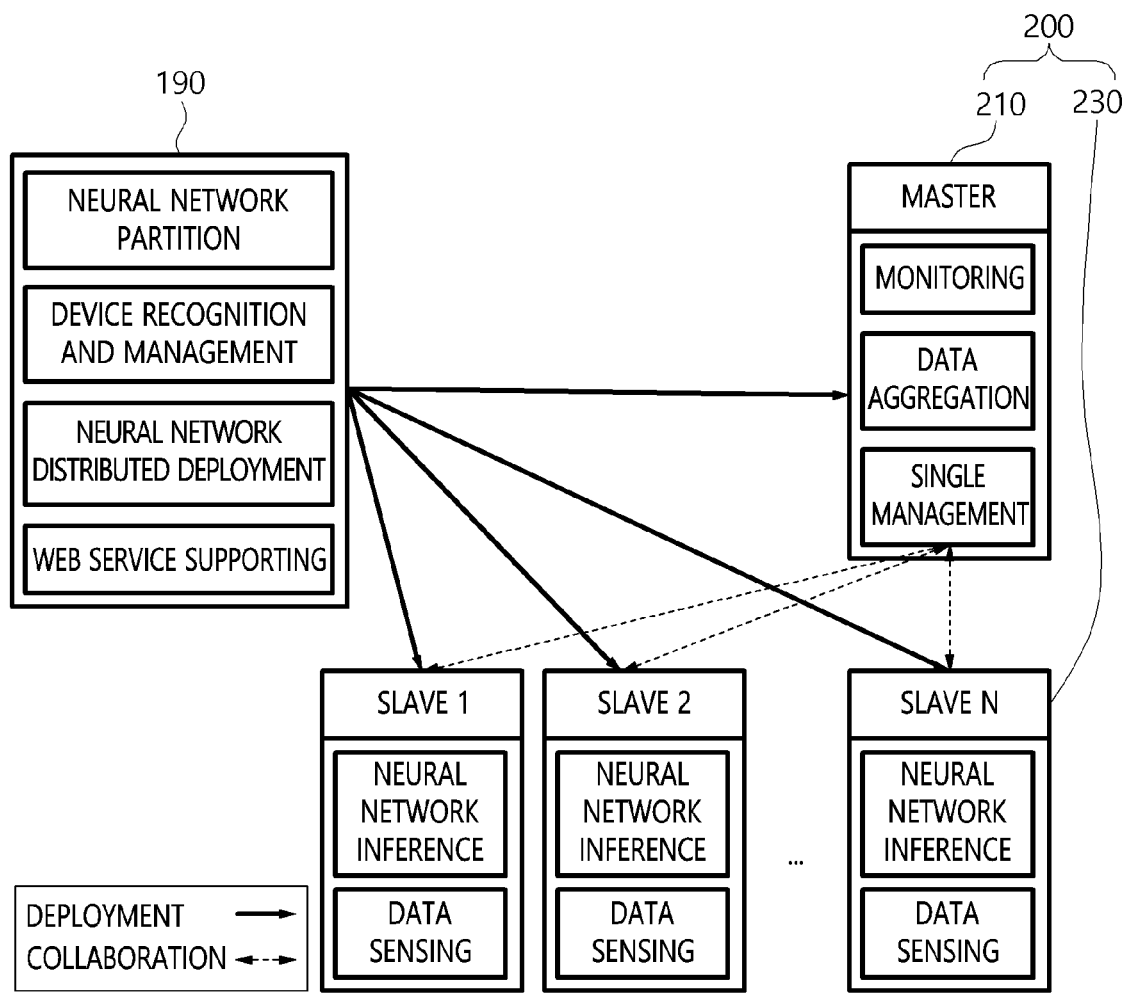
FIG. 3 is a diagram illustrating the detailed operation of the neural network deployment unit of a neural network model deployment apparatus according to an embodiment of the present disclosure.

FIG. 3 is a diagram illustrating the detailed operation of the neural network deployment unit of a neural network model deployment apparatus according to an embodiment of the present disclosure.

As illustrated in FIG. 3, the neural network deployment unit 190 may provide distributed training to the target device 200. For this operation, an inference engine may be generated by partitioning the neural network depending on a user requirement specification. The neural network deployment unit 190 may deploy the neural network to individual distributed devices by recognizing and managing a neighboring target device. Further, the neural network deployment unit 190 may support the neighboring target device so that the neural network is selectively deployed to the selected target device based on the web.

The neural network deployment unit 190 may divide the neural network into a neural network model for a master and neural network models for slaves depending on the user requirement specification, and may deploy the corresponding neural network models to respective target devices. When the deployment of the neural networks is terminated, a master terminal 210 on which the neural network model for the master is installed may manage slave terminals 230 on which the neural network models for the slaves are installed, and may aggregate sensed data to perform a monitoring or neural network application mission.

The neural network model deployment method according to the embodiment may provide convenience to neural network application developers so that a neural network application service is easily and rapidly developed, and may then improve productivity.

Furthermore, the input of the user requirement specification and the training data not only enable the development of an optimal neural network application but also remarkably reduce the time and effort required in a deployment process.

Figure 4:
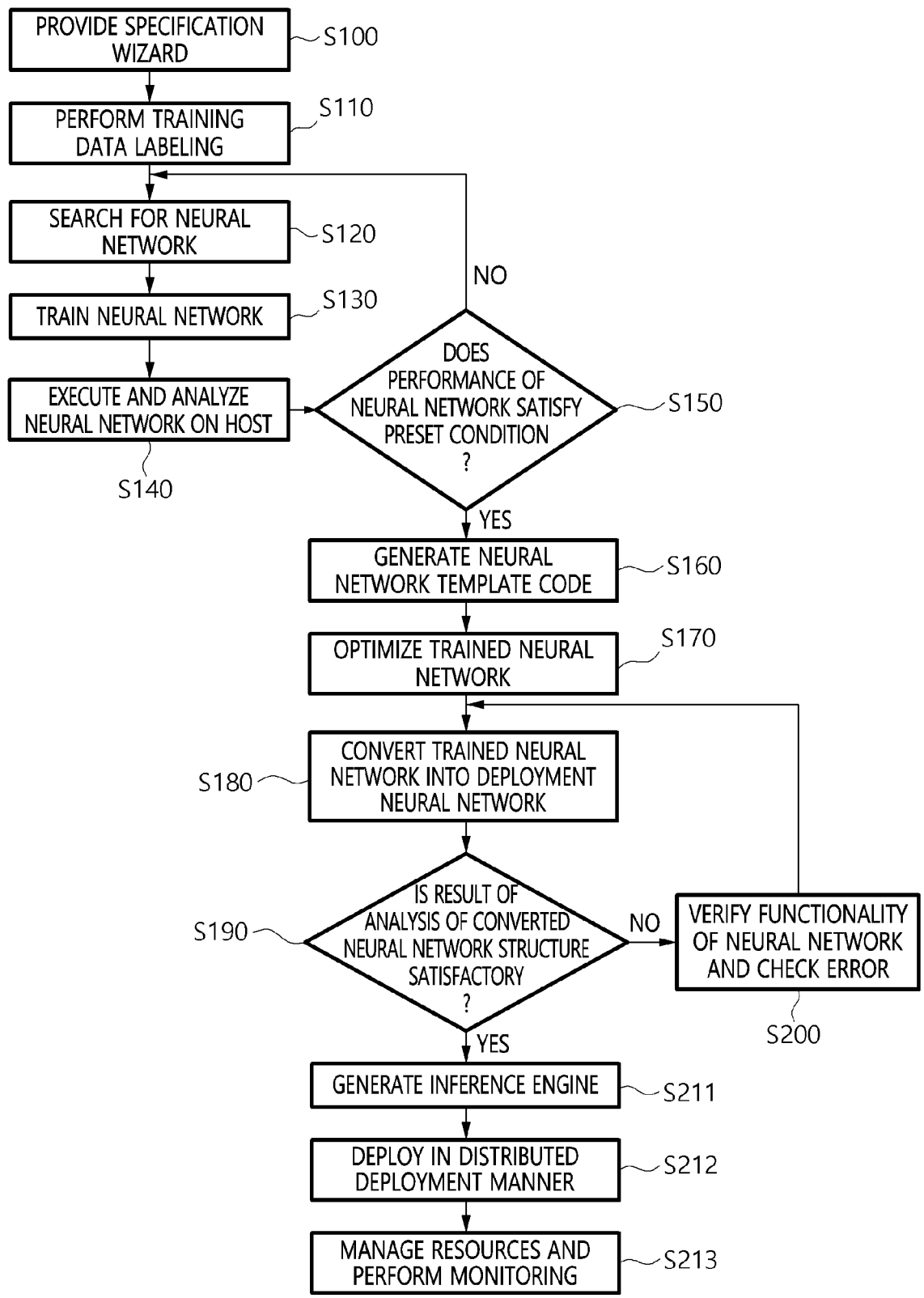
FIG. 4 is a flowchart illustrating a neural network model deployment method according to an embodiment of the present disclosure.

FIG. 4 is a flowchart illustrating a neural network model deployment method according to an embodiment of the present disclosure.

The neural network model deployment method according to the embodiment of the present disclosure may be performed by a neural network model deployment apparatus.

The neural network model deployment apparatus may provide a specification wizard at step S100. The neural network model deployment apparatus may collect information about field selection, image selection, inference method selection, neural network level selection, a deployment method, and a deployment target based on a user requirement specification that is input through the specification wizard.

The neural network model deployment apparatus may perform data labeling on an image at step S110. The neural network model deployment apparatus may search for a neural network based on the user requirement specification at step S120.

The neural network model deployment apparatus may train the found neural network based on training data obtained by performing data labeling at step S130.

The neural network model deployment apparatus may execute and analyze the neural network on a host at step S140. The neural network model deployment apparatus may determine whether the execution performance of the neural network satisfies a preset condition at step S150.

When the execution performance of the neural network does not satisfy the preset condition, the neural network model deployment apparatus may re-search for a neural network, and may repeat the search and training until the execution performance of the neural network satisfies the preset condition. On the other hand, when the execution performance of the neural network satisfies the preset condition, the neural network model deployment apparatus may generate neural network template code at step S160.

The neural network model deployment apparatus may generate the neural network template code based on the user requirement specification.

Figure 5:
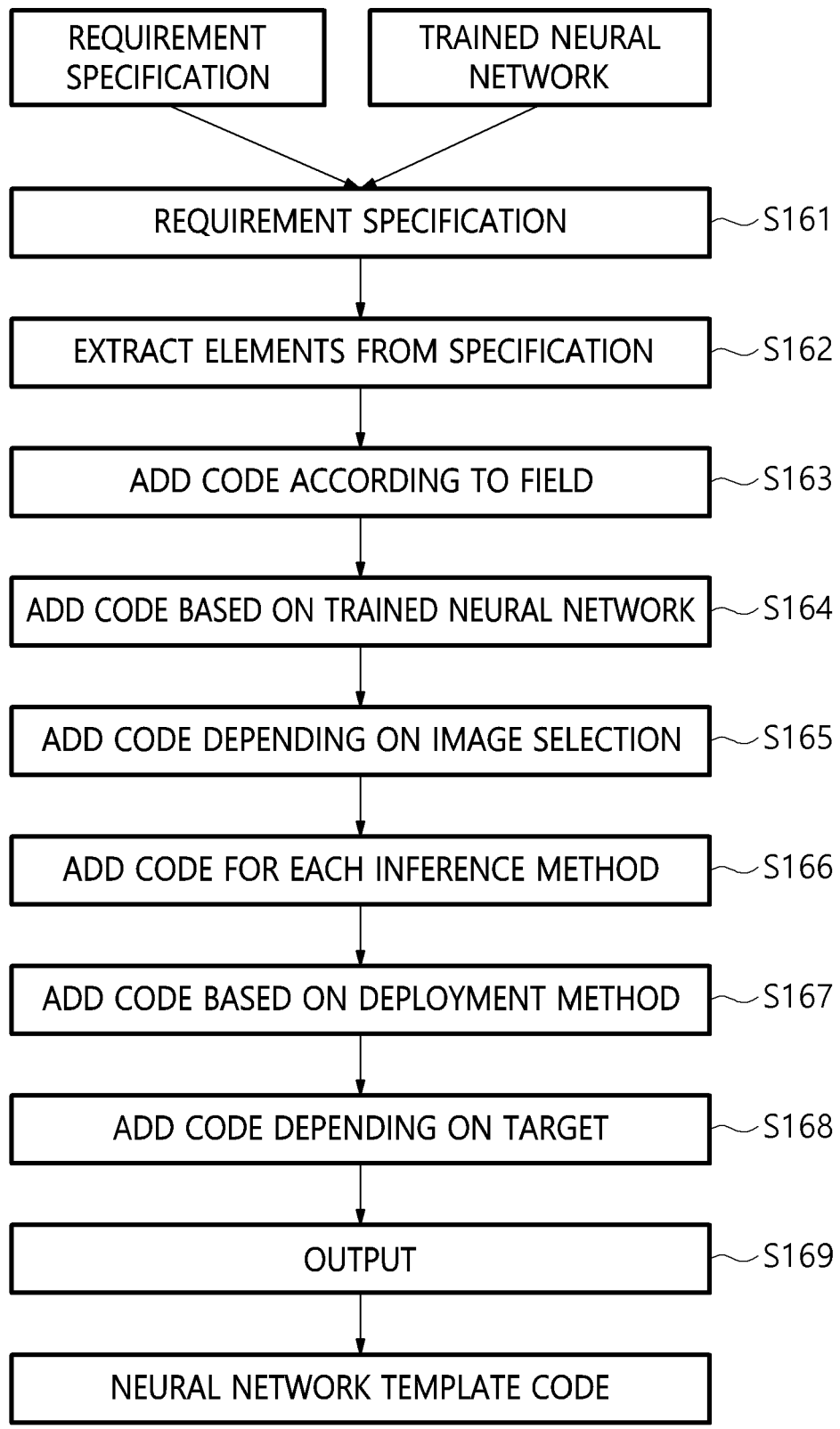
FIG. 5 is a flowchart illustrating a process of generating neural network template code in the neural network model deployment method according to an embodiment of the present disclosure.

FIG. 5 is a flowchart illustrating a process of generating neural network template code in the neural network model deployment method according to an embodiment of the present disclosure.

As illustrated in FIG. 5, the neural network model deployment apparatus may receive the user requirement specification and the neural network at step S161, and may extract elements from the user requirement specification at step S162.

The neural network model deployment apparatus may add required basic code according to the field at step S163, and the codes of input/output portions may be added based on the structure of the trained neural network at step S164.

Next, code may be added depending on the image selection method at step S165, and code for each inference method may be added at step S166. Subsequently, code may be added based on the deployment method at step S167, and code may also be added depending on the target at step S168.

When the addition of the codes is terminated in this way, the codes may be output, and then basic application code may be generated at step S169.

The neural network model deployment apparatus may generate the neural network template code in consideration of the input and output of the neural network, the input of inference data, the output of an inference value, etc. in the basic application code.

Referring back to FIG. 4, the neural network model deployment apparatus may optimize the trained neural network at step S170. The neural network model deployment apparatus may optimize the neural network based on the requirement of a target device.

The neural network model deployment apparatus may convert the trained neural network into the structure of a deployment neural network suitable for the target device based on the user requirement specification at step S180.

The neural network model deployment apparatus may analyze the structure of the converted neural network at step S190. The neural network model deployment apparatus may verify the functionality of the neural network and check error in the neural network when the result of analysis of the neural network structure is not satisfactory and error occurs at step S200. The neural network model deployment apparatus may verify the functionality and check the error, and may then convert the neural network into a deployment neural network.

On the other hand, when the result of analysis of the neural network structure is satisfactory, the neural network model deployment apparatus may generate code and an inference engine that can be easily used in the target device through a container-based build process at step S211.

The neural network model deployment apparatus may deploy the generated inference engine to the target device in a single deployment manner or a distributed deployment manner at step S212. The neural network model deployment apparatus may control and manage the application template of the target device at step S213. The neural network model deployment apparatus may manage the resources of the target device and control the neural network application through a monitoring function.

The neural network model deployment apparatus according to the embodiment may be implemented in a computer system such as a computer-readable storage medium.

Figure 6:
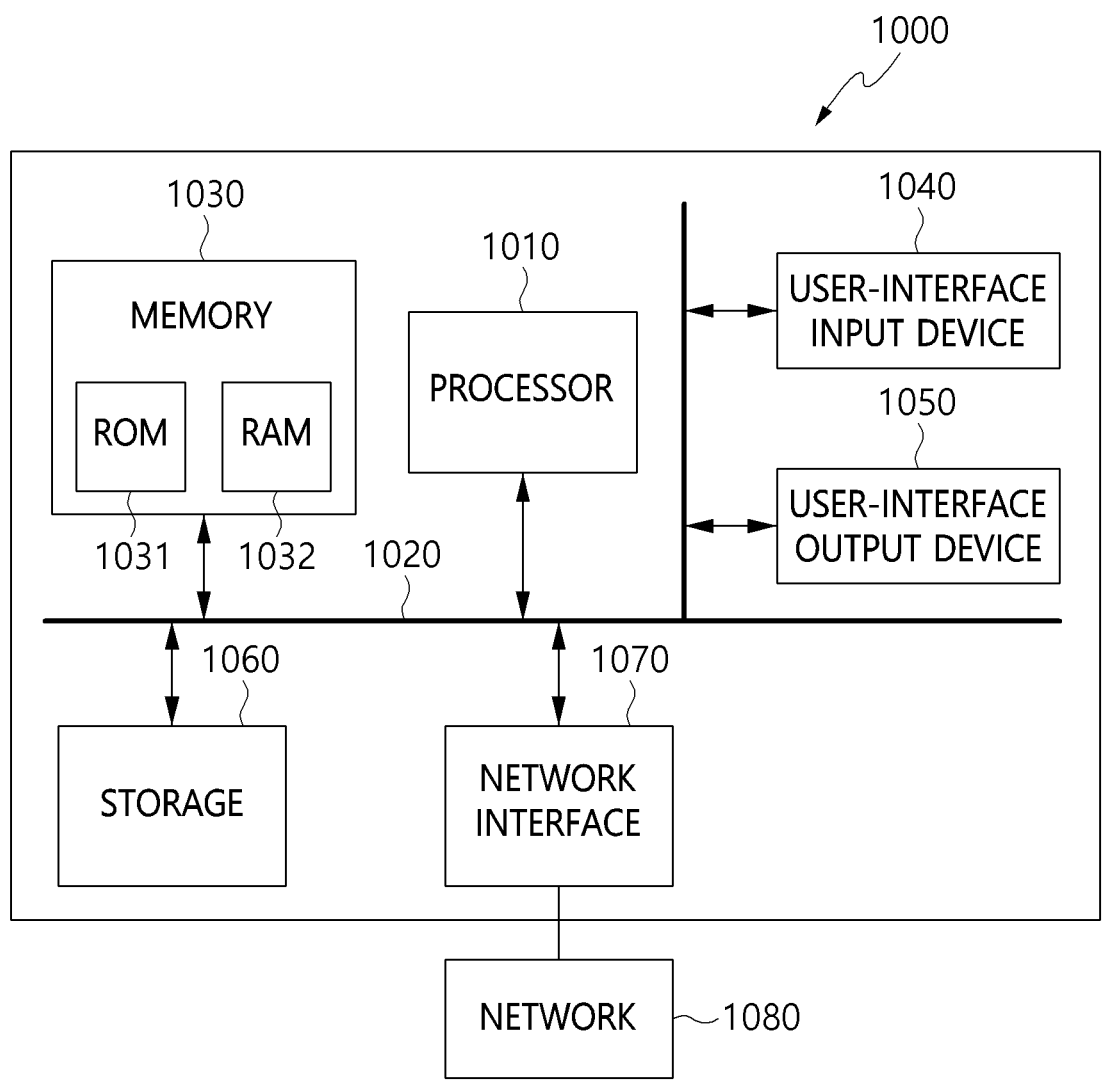
FIG. 6 is a block diagram illustrating the configuration of a computer system according to an embodiment.

FIG. 6 is a block diagram illustrating the configuration of a computer system according to an embodiment.

Referring to FIG. 6, a computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080.

Each processor 1010 may be a Central Processing Unit (CPU) or a semiconductor device for executing programs or processing instructions stored in the memory 1030 or the storage 1060. The processor 1010 may be a kind of CPU, and may control the overall operation of the neural network model deployment apparatus.

The processor 1010 may include all types of devices capable of processing data. The term processor as herein used may refer to a data-processing device embedded in hardware having circuits physically constructed to perform a function represented in, for example, code or instructions included in the program. The data-processing device embedded in hardware may include, for example, a microprocessor, a CPU, a processor core, a multiprocessor, an application-specific integrated circuit (ASIC), a field-programmable gate array (FPGA), etc., without being limited thereto.

The memory 1030 may store various types of data for the overall operation such as a control program for performing a neural network model deployment method according to an embodiment. In detail, the memory 1030 may store multiple applications executed by the neural network model deployment apparatus, and data and instructions for the operation of the neural network model deployment apparatus.

Each of the memory 1030 and the storage 1060 may be a storage medium including at least one of a volatile medium, a nonvolatile medium, a removable medium, a non-removable medium, a communication medium, an information delivery medium or a combination thereof. For example, the memory 1030 may include Read-Only Memory (ROM) 1031 or Random Access Memory (RAM) 1032.

In accordance with an embodiment, a computer-readable storage medium for storing a computer program may include instructions enabling the processor to perform a method including the step of providing a specification wizard to a user, the step of searching for and training a neural network based on a user requirement specification that is input through the specification wizard, the step of generating a neural network template code based on the user requirement specification and the trained neural network, the step of converting the trained neural network into a deployment neural network that is usable in a target device based on the user requirement specification, and the step of deploying the deployment neural network to the target device.

In accordance with an embodiment, a computer program stored in a computer-readable storage medium may include instructions enabling the processor to perform a method including the step of providing a specification wizard to a user, the step of searching for and training a neural network based on a user requirement specification that is input through the specification wizard, the step of generating a neural network template code based on the user requirement specification and the trained neural network, the step of converting the trained neural network into a deployment neural network that is usable in a target device based on the user requirement specification, and the step of deploying the deployment neural network to the target device.

The particular implementations shown and described herein are illustrative examples of the present disclosure and are not intended to limit the scope of the present disclosure in any way. For the sake of brevity, conventional electronics, control systems, software development, and other functional aspects of the systems may not be described in detail. Furthermore, the connecting lines or connectors shown in the various presented figures are intended to represent exemplary functional relationships and/or physical or logical couplings between the various elements. It should be noted that many alternative or additional functional relationships, physical connections, or logical connections may be present in an actual device. Moreover, no item or component may be essential to the practice of the present disclosure unless the element is specifically described as "essential" or "critical".

The present disclosure is advantageous in that a neural network application service may be easily and rapidly developed, thus providing convenience to a user.

Further, the present disclosure is advantageous in that the time required for a process of creating and deploying a neural network application desired by a user may be remarkably reduced.

Therefore, the spirit of the present disclosure should not be limitedly defined by the above-described embodiments, and it is appreciated that all ranges of the accompanying claims and equivalents thereof belong to the scope of the spirit of the present disclosure.

What is claimed is:

1. A neural network model deployment method, comprising:
providing a specification wizard to a user,
searching for a neural network based on a user requirement specification that is input through the specification wizard;
training the searched neural network;
generating a neural network template code based on the user requirement specification and the trained neural network;
converting the trained neural network into a deployment neural network that is usable in a target device based on the user requirement specification; and
deploying the deployment neural network to the target device,
wherein the user requirement specification includes application selection information indicating one of neural network applications presented by the specification wizard, and image classification selection information indicating one of image categories presented by the specification wizard,
wherein searching for the neural network comprises:
searching for a neural network based on the application selection information and the image classification selection information using a tool for searching a neural network,
wherein the specification wizard provides a first set of options from which the user can select one or more neural network applications, and a second set of options from which the user can select one or more image classification categories.

2. The neural network model deployment method of claim 1, wherein the specification wizard provides a screen corresponding to at least one of field selection, image selection, inference method selection, neural network level selection, a deployment method or a deployment target, or a combination thereof.

3. The neural network model deployment method of claim 2, wherein generating the neural network template code comprises:
generating a basic application code by adding codes for the field selection, the image selection, the inference method selection, the neural network level selection, the deployment method, and the deployment target, and generating the neural network template code by applying at least one of input and output of the neural network, input of inference data or output of an inference value, or a combination thereof to the basic application code.

4. The neural network model deployment method of claim 2, wherein the neural network is trained by utilizing, as training data, image data that is input through the screen for the image selection.

5. The neural network model deployment method of claim 4, wherein the training data is generated by performing data labeling on the image data and the neural network is trained based on the generated training data.

6. The neural network model deployment method of claim 1, wherein searching for the neural network further comprises:
when execution performance of the neural network does not satisfy preset performance, performing searching for another neural network.

7. The neural network model deployment method of claim 1, wherein converting the trained neural network into the deployment neural network comprises:
optimizing the trained neural network; and
converting the optimized neural network into the deployment neural network.

8. The neural network model deployment method of claim 7, further comprising:
analyzing a structure of the converted neural network; and
generating a container-type inference engine.

9. The neural network model deployment method of claim 1, wherein deploying the deployment neural network to the target device comprises:
deploying the deployment neural network to the target device in a single deployment manner or a distributed deployment manner.

10. The neural network model deployment method of claim 1, further comprising:
managing a resource of the target device by monitoring the target device after the deployment neural network is deployed to the target device.

11. A neural network model deployment apparatus, comprising:
a memory configured to store a control program for deploying a neural network model; and
a processor configured to execute the control program stored in the memory,
wherein the processor is configured to configured to provide a specification wizard to a user, search for a neural network based on a user requirement specification that is input through the specification wizard, train the searched neural network, generate a neural network template code based on the user requirement specification and the trained neural network, convert the trained neural network into a deployment neural network that is usable in a target device based on the user requirement specification, and deploy the deployment neural network to the target device,
wherein the user requirement specification includes image application selection information indicating one of neural network applications presented by the specification wizard, and classification selection information indicating one of image categories presented by the specification wizard, and the neural network is searched based on the application selection information and the image classification selection information using a tool for searching a neural network,
wherein the specification wizard provides a first set of options from which the user can select one or more neural network applications, and a second set of options from which the user can select one or more image classification categories.

12. The neural network model deployment apparatus of claim 11, wherein the specification wizard provides a screen corresponding to at least one of field selection, image selection, inference method selection, neural network level selection, a deployment method or a deployment target, or a combination thereof.

13. The neural network model deployment apparatus of claim 12, wherein the processor is configured to perform control such that the neural network is trained by utilizing, as training data, image data that is input through the screen for the image selection.

14. The neural network model deployment apparatus of claim 13, wherein the processor is configured to perform control such that the training data is generated by performing data labeling on the image data and the neural network is trained based on the generated training data.

15. The neural network model deployment apparatus of claim 12, wherein the processor is configured to generate a basic application code by adding codes for the field selection, the image selection, the inference method selection, the neural network level selection, the deployment method, and the deployment target and to generate the neural network template code by applying at least one of input and output of the neural network, input of inference data or output of an inference value, or a combination thereof to the basic application code.

16. The neural network model deployment apparatus of claim 11, wherein the processor is configured to, when execution performance of the neural network does not satisfy preset performance, search for another neural network.

17. The neural network model deployment apparatus of claim 11, wherein the processor is configured to optimize the trained neural network and convert the optimized neural network into the deployment neural network.

18. The neural network model deployment apparatus of claim 17, wherein the processor is configured to analyze a structure of the converted neural network and generate a container-type inference engine.

19. The neural network model deployment apparatus of claim 11, wherein the processor is configured to deploy the deployment neural network to the target device in a single deployment manner or a distributed deployment manner.

20. The neural network model deployment apparatus of claim 11, wherein the processor is configured to manage a resource of the target device by monitoring the target device after the deployment neural network is deployed to the target device.

* * * * *